(12) United States Patent
Wynn et al.

(10) Patent No.: US 7,758,670 B2
(45) Date of Patent: *Jul. 20, 2010

(54) FOUR-PORT GAS SEPARATION MEMBRANE MODULE ASSEMBLY

(75) Inventors: Nicholas P. Wynn, Redwood City, CA (US); Donald A. Fulton, Fairfield, CA (US); Kaaeid A. Lokhandwala, Fremont, CA (US); Jurgen Kaschemekat, Campbell, CA (US)

(73) Assignee: Membrane Technology and Research, Inc, Menlo Park, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 11/484,547

(22) Filed: Jul. 11, 2006

(65) Prior Publication Data

US 2008/0011157 A1 Jan. 17, 2008

(51) Int. Cl.
*B01D 53/22* (2006.01)

(52) U.S. Cl. ............... 95/45; 95/51; 95/52; 95/54; 96/4; 96/7; 96/8; 96/9; 96/10; 210/321.78; 210/321.79; 210/321.88

(58) Field of Classification Search ............ 96/4, 96/7, 8, 9, 10; 95/45, 51, 52, 54; 210/321.72, 210/321.74, 321.78, 321.79, 321.8, 321.88, 210/321.89, 500.23
See application file for complete search history.

(56) References Cited

U.S. PATENT DOCUMENTS

| | | | |
|---|---|---|---|
| 3,774,771 A | 11/1973 | Manjikian et al. | |
| 4,083,780 A | 4/1978 | Call | |
| 5,238,563 A | 8/1993 | Smith, Jr. et al. | |
| 6,755,894 B2 * | 6/2004 | Bikson et al. | 96/8 |
| 6,942,797 B1 * | 9/2005 | Chancellor et al. | 210/321.64 |
| 7,179,323 B2 * | 2/2007 | Stein et al. | 96/7 |
| 7,404,843 B2 * | 7/2008 | Kaschemekat et al. | 95/45 |
| 7,510,594 B2 * | 3/2009 | Wynn et al. | 95/45 |
| 2005/0029192 A1 * | 2/2005 | Arnold et al. | 210/321.72 |
| 2005/0284293 A1 * | 12/2005 | Rubas | 96/8 |
| 2006/0011535 A1 | 1/2006 | Ikeda et al. | |
| 2006/0144777 A1 * | 7/2006 | Kumano et al. | 210/321.79 |

* cited by examiner

*Primary Examiner*—Jason M Greene
(74) *Attorney, Agent, or Firm*—J. Farrant

(57) ABSTRACT

A gas-separation membrane assembly, and a gas-separation process using the assembly. The assembly incorporates multiple gas-separation membranes in an array within a single vessel or housing, and is equipped with two permeate ports, enabling permeate gas to be withdrawn from both ends of the membrane module permeate pipes.

22 Claims, 10 Drawing Sheets a 801
802
← 48 ft → b 804
803
← 15 ft → c 806
805
← 11 ft →

FOUR-PORT GAS SEPARATION MEMBRANE MODULE ASSEMBLY

This invention was made in part with Government support under SBIR award number DE-FG02-03ER83836, awarded by the U.S. Department of Energy. The Government has certain rights in this invention.

FIELD OF THE INVENTION

The invention relates to gas separation membranes, and specifically to an assembly for gas separation membranes. In particular, the invention relates to an assembly of multiple membrane modules contained in a single housing or pressure vessel.

BACKGROUND OF THE INVENTION

Gas separation membranes have been in industrial use for close to 25 years. Various types of membrane are available, although almost all commercially successful membranes are polymeric membranes formed as flat sheets or hollow fibers.

For use, it is desirable to pack a large membrane area into a small volume. Because membranes are delicate, susceptible to damage and may have a limited operating life, they are normally factory-built into modules or elements.

Two predominant types of membrane modules have emerged. If the membranes are in hollow-fiber form, bundles or hanks of closely spaced fibers are potted in a cylindrical pressure housing or tube. A single hollow fiber module may contain as much as 1,000 km of fiber. Feed gas may flow on the shell or bore side of the fibers. The permeate gas may be routed to a single collection pipe by which it exits the module.

Flat-sheet membranes are commonly packaged into spiral-wound modules. A spiral-wound module has a central perforated permeate collection tube, around which are wound membrane envelopes interleaved with spacers to define feed and permeate channels. The module is usually finished with an outer wrap of fiberglass or the like and mounted in a pressure housing. Feed passes axially down the module across the membrane envelope. A portion of the feed permeates into the membrane envelope, where it spirals towards the center and exits through the collection tube, which may protrude at one or both ends beyond the membrane envelope. Modules typically contain multiple membrane envelopes, such as 20 or more, and have a usable membrane area of up to 40 or 50 $m^2$.

Less commonly, membrane elements may take other forms. For example, they may simply be rigid tubes, such as ceramic tubes, with the selective membrane as the inside or outside surface.

Modules or elements are normally built in standard sizes. Ideally, the standard size module is limited to that which can be manhandled easily by one or two persons, with a weight up to about fifty pounds. The requirement for a specific membrane area is met by installing the appropriate number of factory-made elements in suitable permanent housings. If the membranes need to be replaced in the field, the complete module is removed from the housing and replaced with a new factory-built module. This procedure minimizes any plant downtime required for membrane replacement.

In gas processing plants, gas flows and membrane performance are such that membrane area requirements may be very large, in the range of hundreds, thousands or even tens of thousands of square meters. Large numbers of modules need to be installed in such plants and housed in an effective and economical manner.

In gas separation, individual modules or elements are connected end-to-end, typically in a line of up to about six elements, within a single tube. The tube serves not only to house and support the membrane elements and provide a directed gas flow, but also as the pressure-withstanding vessel that permits operation of the membrane unit at pressures substantially different from the outside atmospheric pressure. The tubes are usually made of stainless or carbon steel, and pressure code-stamped for their intended application.

Various other arrangements have been proposed for arranging multiple membrane modules or elements within a single pressure housing, mostly for reverse osmosis applications.

U.S. Pat. No. 3,774,771 describes an assembly of modules mounted in parallel within a single housing. The modules consist of product tubes around which a piece of reverse osmosis membrane is wound in a helical pattern. Each of these modules is contained within a feed flow tube. The feed flow tubes are connected so that feed can be introduced through an inlet at one end of the housing to several tubes in parallel, can pass down this set of tubes to the other end of the housing, and then pass back along the housing through another set of tubes. Residue is withdrawn from this set of tubes through an outlet adjacent to the feed inlet. Liquid that has permeated the membranes and entered the product tubes is collected and withdrawn through an outlet at the other end of the module.

Each feed flow tube has a hole that allows a volume of feed liquid to leak out from the processing path within the tubes to the space within the housing outside the feed tubes. In this way, pressure is equalized on both sides of the tubes. The assembly is used for reverse osmosis.

U.S. Pat. No. 4,083,780 describes an assembly containing multiple tubes arranged in parallel, with multiple spiral-wound modules in series within each tube.

U.S. Pat. No. 5,238,563 describes an assembly in which multiple membrane modules or elements are housed in parallel. The feed is introduced through a nozzle in the longitudinal shell of the housing and occupies the space between the external surfaces of the modules and the internal surface of the housing.

U.S. Published Application 2006/0011535 describes an assembly in which multiple ceramic membrane tubes are housed. The tubes are arranged so that two membrane separation steps can be carried out within the single housing.

U.S. patent application Ser. No. 11/050,995, co-owned and copending with the present application, describes an assembly containing multiple tubes arranged in parallel, each tube containing one or more membrane modules. The tubes are supported by two tube sheets that divide the interior of the assembly into three gas-tight spaces. This application is incorporated herein by reference in its entirety.

U.S. patent application Ser. No. 11/271,402, co-owned and copending with the present application, describes an assembly containing multiple tubes arranged in parallel, each tube containing one or more membrane modules. The housing contains a tube sheet that divides the space within the housing into two gas-tight spaces. A permeate collection system within the housing gathers permeate gas from the tubes for discharge from the housing. This application is incorporated herein by reference in its entirety.

There remains a need for assemblies that enable gas separation membrane modules to be housed in compact housings that are simple and safe, as well as inexpensive to manufacture, and that provide for easy replacement of modules within the housing. As new gas separation applications develop, some with very large membrane area requirements, this need is more pressing.

SUMMARY OF THE INVENTION

The invention has two aspects: a gas-separation membrane assembly, and a gas-separation process using the assembly. In a basic embodiment, the assembly comprises a set of tubes containing the gas-separation membranes, the tubes being arranged within a single vessel or housing.

In its most general embodiment, the assembly is a housing including (i) first and second ends, (ii) a shell between the ends, and (iii) four ports in the housing through which gas may enter or leave the housing, the housing enclosing;
(a) an interior region comprising four discrete, gas-tight areas, of which two areas are a first permeate collection area and a second permeate collection area, the third area is a feed gas distribution area and the fourth area is a residue gas collection area, each gas-tight area being provided with access to one port so that gas may enter or leave the gas-tight area through that port;
(b) a plurality of tubes positioned in spaced-apart, parallel relationship, each tube having a longitudinal tube wall, a first tube end and a second tube end;
(c) within the tubes, a multiplicity of gas separation membrane elements, each containing gas separation membranes, each gas separation membrane having a feed side and a permeate side;
(d) for each tube, a permeate collection pipe adapted to capture a permeate gas from the gas separation membrane elements within that tube, each permeate collection pipe having a first collection end accessing the first permeate collection area and a second collection end accessing the second permeate collection area;
(e) a tube sheet supporting the tubes and dividing the feed gas distribution area from the residue gas collection area.

In light of the teachings presented in this summary and the following detailed description of the invention, it will be apparent to the skilled worker that various essentially equivalent mechanical options are available to achieve the above-defined combination of elements, such as to support the tubes in the space, and to provide the separation of the designated gas-tight areas and the means of gas flow between them.

Likewise, it will be appreciated that the assembly will incorporate a number of standard components familiar to those of skill in the art, including, but not limited to, O-rings, seals, end caps and connectors of various kinds, such as are needed to provide gas-tight closure between elements, for example, or to connect individual parts.

The housing may be of any shape and construction appropriate to its function, which is to contain the tubes, and to provide pressure- and gas-tight spaces or environments into which gas can be introduced, and from which it can be withdrawn. Typically the housing is a steel pressure vessel with two ends and an elongated central section, adapted to withstand the relatively high differential pressures that are used in gas separation, and pressure code-stamped accordingly.

Preferably, the vessel is a cylindrical shell with two ends, one or both of which take the form of reversibly removable heads.

The tubes containing the gas-separation membranes are mounted in the interior of the housing, usually in a longitudinal direction, that is, parallel to a long axis of the housing and to each other.

The tubes contain gas-separation membranes of any type usable for gas separation, including, but not limited to, polymeric membranes with a rubbery selective layer and polymeric membranes with a glassy selective layer. Preferably, the membranes are formed as hollow fibers or flat sheets. Each membrane has a feed side over which gas to be treated may be passed, and a permeate side from which gas that permeates the membranes may be withdrawn.

The membranes are usually packaged into membrane elements or modules. If the membranes are flat sheet membranes, they are preferably packaged into spiral-wound modules.

The tubes may contain two or more membrane elements aligned end to end, preferably in series, so that gas that has passed across one membrane element flows into the next element.

The elements include a permeate collection pipe, through which gas that has permeated the membranes can be collected and withdrawn. Usually, each element has its own individual permeate pipe, and the individual pipes are connected together end-to-end to form a permeate collection pipe that runs the length of the tube, leaving an open collection end protruding from the first and last elements in each tube. Thus the collection ends protruding from the first elements in each tube form a set, as do the collection ends protruding from the last elements in each tube.

The interior of the housing is divided into four gas-tight areas, each connected to its own port in the housing. The ports permit gas for treatment to enter the housing and treated gas to leave the housing.

Two of the gas-tight areas are permeate collection areas. The permeate collection areas are separate from each other; one area receives gas from one set of protruding collection ends; the other area receives gas from the other set. The other two areas are the feed gas distribution area, which receives feed gas into the housing and distributes the feed gas to the tubes, and thence to the membrane elements, and the residue gas collection area, which receives residue gas from the tubes.

The tubes are usually mounted in the housing by means of a tube sheet, which supports the tubes directly or indirectly. The tube sheet is aligned generally perpendicular to the longitudinal axes of the housing and is connected in gas-tight relationship with the interior wall of the housing, so that gas cannot pass directly between areas separated by the tube sheet.

The assembly may have only one tube sheet, which supports the tubes and divides the feed gas distribution area from the residue gas collection area, or multiple tube sheets.

The permeate collection areas must be sealed in gas-tight manner from the feed and residue gas areas. One preferred way to do this is to position a permeate manifold within the housing, in the feed space or the residue space. The manifold is equipped with extension pipes that connect to one of the sets of collection ends, so that permeate gas can pass from the collection ends through the extension pipes and into the manifold.

The manifold is further connected to one of the ports, which thus forms a permeate port. Preferably the permeate port is equipped with a nozzle or flange facing inward, so that the connection of the manifold to the permeate port is also within the housing.

A second preferred way to form a permeate collection area is to divide the permeate collection area from the feed distribution area or from the residue collection area by means of an additional tube sheet. In this case, the permeate collection pipes or extensions thereof pass through openings or holes in the tube sheet to allow permeate gas to flow to the permeate collection space.

The two preferred ways to form the permeate collection areas may be combined in one assembly, such that one permeate collection area is formed by a permeate manifold system and the other by the use of an additional tube sheet. Alternatively, both collection areas may be formed by manifolds, one positioned toward one end of the housing and the other toward the other end, or both collection areas may be formed by tube sheets, so that one permeate collection area is separated from the feed distribution area by a tube sheet and the other is separated from the residue collection area by a tube sheet. In this case, three tube sheets are need to define the four areas.

The tubes are adapted to allow gas from the feed gas distribution area to enter the tubes and to permit gas that has passed across the feed sides of the membranes to flow out of the tubes into the residue collection space. The tubes may simply open at their ends into these spaces or areas. As another alternative, one or both ends of the tubes may be sealed, and each tube may have an aperture or hole in its long, cylindrical surface that permits gas to pass from the tube into the area outside the tube.

The tubes are placed with respect to the four gas-tight areas so that the outer cylindrical surfaces of the tubes may be within the feed gas area, or the residue gas area, or both areas, but are not within the permeate collection areas.

The tubes may be of any material and thickness appropriate to their function. During operation of the assembly in a gas-separation process, there is usually little pressure drop between the feed and residue gas streams. As both the inside and outside surfaces of the cylindrical tube walls are only exposed to feed or residue gas, the tubes do not need to withstand high pressure differences, and can be of relatively thin, light construction.

For the same reason, the tube sheet that separates the feed and residue gas areas need not be rated for high pressure differences, and, subject to maintaining its ability to space and support the tubes, may be of relatively thin, lightweight construction.

If additional tube sheets are used to divide the feed or residue gas space from a permeate collection space, such tube sheets must be rated appropriately to withstand the pressure difference between the two areas.

Although elements or features of the assembly have been qualified above by the adjectives "feed" or "residue", this has been done for ease of explanation, and does not mean that the assembly has, necessarily, to be used with the feed gas entering at a defined feed port into the feed gas space and the residue gas leaving through a defined port from the residue gas collection area. The assembly can be operated in various ways. This point is discussed further in the detailed description below.

The gas separation assembly of the invention uncouples the two primary functions of the conventional pressure tubes. The membrane modules are contained and the gas flow is directed by the tubes, which need not be pressure rated or code-stamped for high pressure differences. These tubes may be made from many types of standard, off-the-shelf seamless piping, or may be manufactured to much lower pressure-rating than the housing. The pressure-withstanding function is now fulfilled by the outer vessel or housing, within which the multiple tubes are contained.

Furthermore, because of the plurality of tubes, the assembly allows large numbers of standard size membrane elements to be accommodated in a single housing. Because the gas feed, residue and permeate connections to the plurality of tubes are internal to the assembly, complex external piping and manifolding systems are not required. The assembly itself fulfills this function, but in a more effective way.

Conventional systems using individual pressure tubes connected by external piping are complex, require much space, and are costly to build. This is especially so in gas processing because the materials being processed are often hazardous and their safe containment is an absolute necessity.

If these connections are made internal to the pressure vessel, the pressure vessel itself provides the containment in a more robust and compact manner than external piping, and with fewer flanges, gaskets, joints and connectors. The greater simplicity allows faster access, and correspondingly less down time, to replace membrane modules, as well as reducing potential for leakage of hazardous materials. In particular, the number of pipes, flanges and connections is reduced enormously. For example, if the housing contains seven membrane module tubes, the number of external flanges and connecting pipes is reduced seven-fold.

Thus, this uncoupled arrangement offers a number of advantages compared with conventional pressure housing of membrane modules in a single linear arrangement.

The assembly is also lighter in weight than a conventional array of tubes containing the same amount of membrane area, because only the one outer vessel, rather than each tube, need be built to high-pressure-resistant specification. In addition, heat tracing or insulation of the modules is greatly simplified.

These differences result in very substantial savings in terms of manufacturing complexity and capital cost of equipment.

In its second aspect, the invention is a gas-separation process using the assembly in any of its embodiments. The process may be used to separate components of any gas or vapor mixture, and is expected to be especially useful in refinery or natural gas treatment applications, where gas flow rates tend to be large and gas pressures high.

BRIEF DESCRIPTION OF THE DRAWINGS

FIG. 8(a) represents an assembly using conventional pressure tubes, and not in accordance with the invention. FIG. 8(b) represents an assembly of the invention using vessels housing seven tubes, and FIG. 8(c) represents an assembly of the invention using vessels housing 19 tubes.

DETAILED DESCRIPTION OF THE INVENTION

Figure 1:
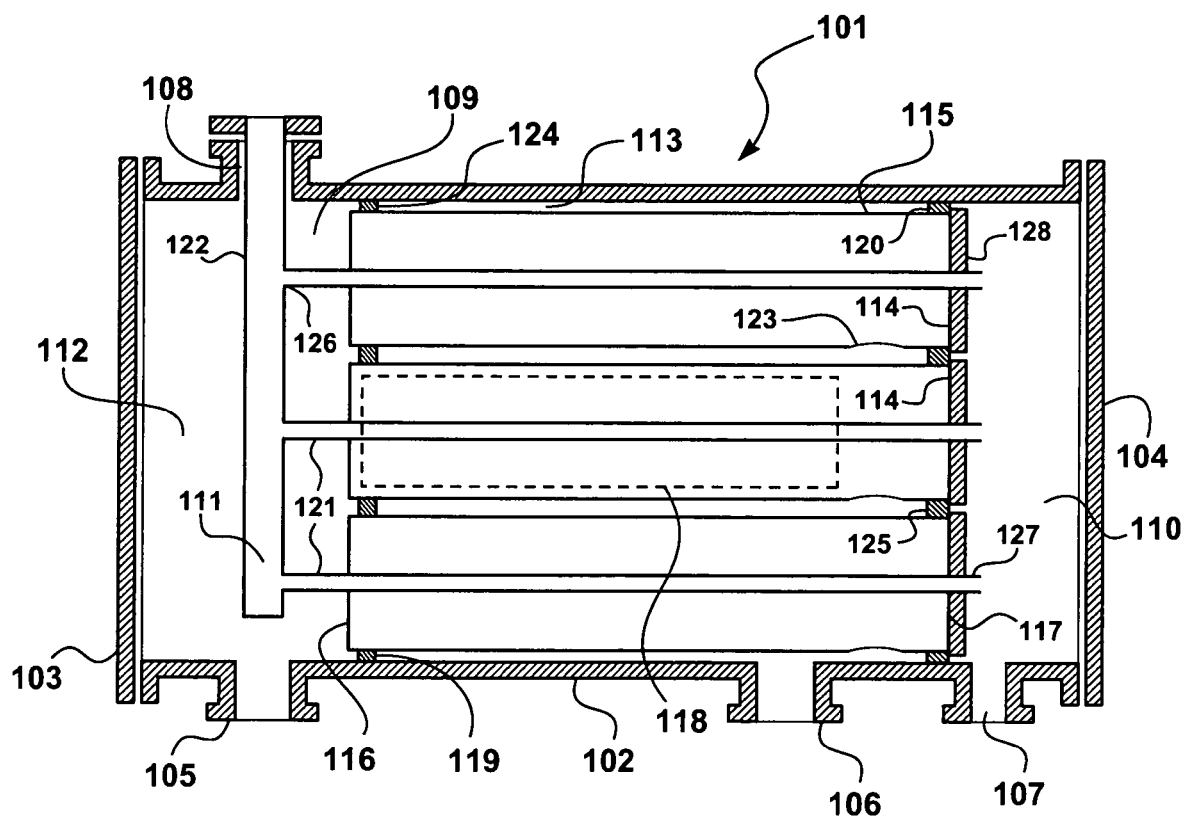
FIG. 1 is a schematic drawing showing a longitudinal section through a basic embodiment of the invention in which one permeate collection area is formed by an internal permeate manifold and the other is formed by a tube sheet.

The invention is a gas-separation membrane assembly, and a gas-separation process using the assembly. The assembly incorporates multiple gas-separation membranes in an array within a single vessel or housing, the terms vessel and housing being used interchangeably herein.

Feed gas to be treated by membrane separation can be introduced into the housing; the separated, treated gas can be withdrawn from the housing.

The vessel may be of any form appropriate to its function, which is to provide an internal environment in which membrane gas separation can be carried out safely at substantially different (higher or lower) pressures than the outside atmospheric pressure.

A variety of vessel shapes are possible within the scope of the invention, although typically the housing is of elongated form. Most preferably the housing takes the form of a cylindrical vessel, that is, a vessel having a cylindrical shell and two ends.

At least one of the ends, and optionally both, should be a reversibly removable end cap or head that provides access to the interior of the housing for installation or removal of membrane modules. By this, we mean that the head should not be a unitary part of the vessel as cast, nor attached by welding, but should be bolted, screwed, or the like, to the vessel.

The end caps may have any appropriate profile, but usually will be flat or dished. Removable heads typically include a flange or flanges or a screw thread for attachment to the shell body of the vessel.

Many gas separations, such as those used to bring natural gas to pipeline specification, are performed with the feed gas to the membrane units at elevated pressure, such as above 150 psig, above 300 psig, above 500 psig or even up to 1,000 psig or more. The permeate gas may also be maintained at above atmospheric pressure in some cases, or may be under vacuum in others. Thus, considerable pressure differences frequently exist between the outside and inside of the vessel, and between feed and permeate containing components within the vessel, and the vessel should be pressure-rated and code-stamped accordingly. For convenience herein, we refer to gas separation applications in which the vessel is pressure-rated or code stamped for pressures in the hundreds of psi as intermediate-pressure applications and gas separation applications in which the vessel is pressure-rated or code-stamped for pressure of 1,000 psi or above as high-pressure applications.

The material of which the vessel is formed may vary depending upon the use to which it is to be put and the pressure-rating required. Typically the vessel will be metal, usually steel, either stainless or carbon, although other metals, or even non-metallic materials, could be used in some circumstances.

Within the housing are multiple tubes that carry the membrane modules and provide a directed path for gas flow. In principle, many ways to arrange the tubes within the interior space of the vessel can be imagined within the scope of the invention. Based on size, weight and cost considerations, however, the tubes should be packed efficiently into the housing, so as not to leave large volumes of space unoccupied by the tubes.

The preferred arrangement is to align the tubes approximately parallel to each other and to the long axis of the shell of the housing, so that a large number of tubes may be accommodated by a vessel of comparatively small cross-section. Most preferably, the vessel contains seven tubes, with a central tube surrounded by six tubes, or 19 tubes, with a central tube surrounded by a first ring of six tubes and a second ring of 12 tubes.

The functions of the tubes include carrying the membranes, usually arranged as membrane elements (also commonly referred to as membrane modules or cartridges) and directing gas flow. Each tube usually contains at least two membrane elements. Most preferably, each tube contains at least two, and no more than about six, membrane elements.

The type and configuration of the membranes and modules is not a limiting aspect of the invention; any types of membranes and modules known in the gas separation arts can be housed in the present assembly. The membranes may be any type of membrane usable for gas separation, including, but not limited to, polymeric membranes with a rubbery selective layer and polymeric membranes with a glassy selective layer.

Figure 9:
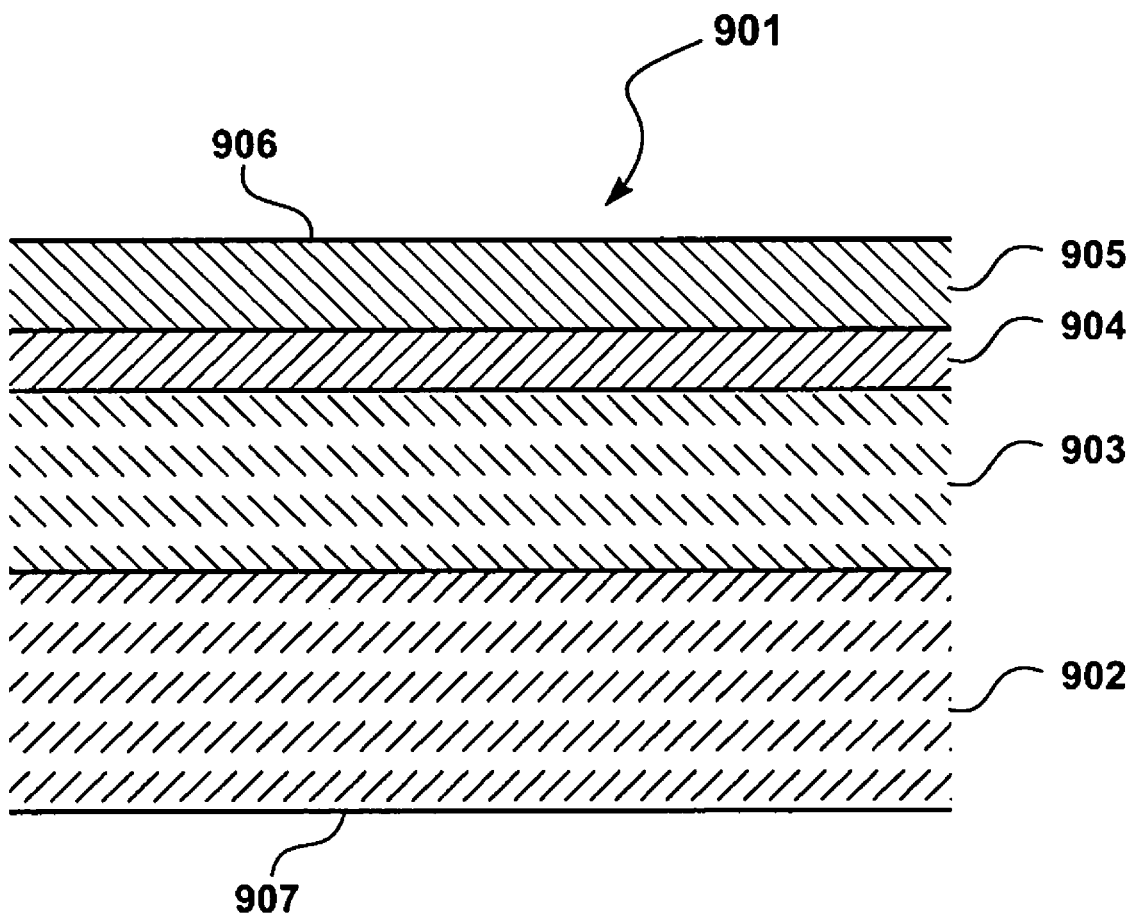
FIG. 9 is a schematic cross sectional drawing of a gas separation membrane.

FIG. 9 is a simple schematic drawing, not to scale, showing a cross section of a typical polymeric composite gas separation membrane, 901. The membrane is made up of a backing layer, 902, a microporous support layer, 903, a thin dense selective layer, 904, and a protective coating layer, 905. This illustration is representative, not limiting; the membrane may have more or fewer layers than shown, and need not be polymeric. The membrane is usually used with the selective layer uppermost, that is, facing the feed stream, so that side, 906 is the feed side, and the backing layer facing the permeate stream, so that side 907 is the permeate side.

Most commonly, industrial gas separation membranes are prepared as hollow fibers and packaged as potted hollow-fiber modules, or prepared as flat sheets and packaged as spiral-wound modules. As a less common example, they may be in tubular form, with the selective membrane on the inner or outer surface. This type of module is sometimes used when the separation membranes themselves are inorganic, or are supported on an inorganic support membrane, for example.

These forms are well known in the art and are described copiously in the literature. For simplicity, therefore, the details of module placement and connection, and gas flow around and within the modules, are described below as they relate to polymeric membranes packaged as spiral-wound modules. Those of skill in the art will appreciate that similar arrangements of modules within the tubes and housing can be used for hollow-fiber modules or other arrangements, subject only to conventional modifications as need be.

A spiral-wound module comprises one or more membrane envelopes of spacers and membrane wound around a perforated central permeate collection pipe. Typically, the pipe protrudes a short distance beyond the membrane envelopes. When the module is in use, feed gas passes axially down the module across the membrane envelope. A portion of the feed permeates into the membrane envelope, where it spirals towards the center, is drawn through the perforations into the permeate collection pipe and exits through the end of the pipe. The residue gas exits the module axially at the opposite end from that at which the feed gas is introduced.

If a tube contains multiple modules, the modules are connected end-to-end, meaning that permeate gas leaving one module can flow into the permeate channel of the next module. This can optionally be achieved by having one long continuously formed permeate collection pipe around which multiple membrane modules are wrapped. More preferably, however, the permeate pipes of the individual modules are separate pipes joined by gas-tight connectors or couplings to form the complete permeate collection pipe for the tube.

Most preferably, the couplings join the individual element permeate pipes in a reversible manner, so that an individual membrane element can be removed and replaced as necessary. For example, the connectors may be flanged or screwed. More commonly they take the form of proprietary quick-release fittings of clamped or compression design, such as TriClover® or Swagelok® fittings, or are simple bayonet fittings with O-ring seals.

The inside diameter of a tube is usually, and preferably, only marginally larger in diameter than the outer diameter of the membrane module(s) that it contains, so that the modules, with their permeate collection pipes connected, can simply be pushed into the tubes, where they fit snugly without additional support.

An elastomeric seal, or the like, is normally fitted around the circumference of the modules to provide a gas tight fit to prevent incoming gas bypassing the module. In this case, gas introduced from the feed gas space into a tube enters the first end of the first membrane module, passes along the module and exits at the residue end into the space within the tube between the first and second modules. The gas flowing through this space forms the feed to the second module, and so on.

As an alternative, the modules can be spaced a distance from the inner wall of the tube, such as by means of a perforated inner tube of smaller diameter, so that gas entering the tube from the feed space may flow directly into any and all of the first, second or subsequent membrane elements in a parallel flow configuration.

The tubes are held in the vessel by means of a tube sheet, aligned generally perpendicular to the longitudinal axes of the housing and the tubes, which supports the tubes. One tube sheet is required; additional tube sheets are optional.

The required tube sheet divides one gas-tight area from another. For ease of nomenclature and clarity of explanation, the one area is designated the feed gas distribution area, and the other is designated the residue gas collection area, and elements or features of the assembly identified similarly refer to elements or features in or near those spaces. However, it should be noted that this nomenclature is used because it describes conveniently a mode in which the inventors prefer to operate the assembly for gas separation, not because it describes intrinsic properties of the spaces.

The vessel and tube sheet are connected in gas-tight relationship with each other, so that gas cannot bypass the membrane-containing tubes and flow directly from the feed gas distribution area to the residue gas collection area. The tube sheet may be removably or permanently secured to the vessel in any known manner, for example, by welding.

The tube sheet may be positioned anywhere along the length of the tubes. Specific embodiments in which it is convenient to position the tube sheet at or near the middle of the tubes, or at or near one or other end are described below.

The tubes may be made of the same material as the vessel, such as steel. Preferably the tubes are positioned so that both the outside and inside walls of the tubes are in contact only with feed or residue gas. In this configuration, the tubes are exposed across their walls at most only to a small pressure difference between the feed and residue gas. As a result, the tubes may be made from off-the-shelf seamless piping, for example, or may be manufactured to much lower pressure-rating than was required for the pressure tubes of prior art gas separation systems. The pressure-withstanding function is now fulfilled by the outer vessel or housing, within which the multiple tubes are contained.

Likewise, the required tube sheet need only withstand the slight feed-to-residue pressure drop and can be made much thinner and lighter than conventional, industrial gas-separation tube sheets.

In the preferred mode of operating the assembly, gas flows into the housing through the feed port to the feed gas distribution area, and from there enters the tubes and the first membrane module. Residue gas from the last module in line in the tube flows out of the end of the last module, out of the tube and into the residue gas collection area, whence it is withdrawn through the residue gas port.

Thus, the tubes must be adapted to allow feed gas to enter from the feed gas distribution area and to permit residue gas to flow out into the residue gas collection area. The simplest way to achieve this is to position the tube ends in these respective spaces, and to leave the tube ends open.

If one or both tube ends are closed, then one or more apertures or openings near the closed end, and large enough to provide unobstructed gas flow, may be provided in the cylindrical walls of the tubes. As one example adaptation, each tube has at least one aperture or hole in its long, cylindrical surface.

As another alternative, a pipe may be provided at an otherwise closed tube end to gather gas from or distribute gas to the modules in the tubes.

The interior of the housing is divided into four gas-tight areas, each connected to its own port in the housing. The ports permit gas for treatment to enter the housing and treated gas to leave the housing.

Two of the gas-tight areas are the feed gas distribution area and the residue gas collection area, described above. The housing is equipped with a feed port open to or connecting with the feed gas distribution area and a residue port open to or connecting with the residue gas collection area.

The other two areas are permeate collection areas. The permeate collection areas are separate from each other; one area receives gas from one set of protruding collection ends; the other area receives gas from the other set. Each permeate gas collection area is open to or connects with a permeate port.

The permeate collection areas must be sealed in gas-tight manner from the feed and residue gas areas.

One preferred way to do this is to position a permeate manifold within the housing, in the feed space or the residue space. The manifold gathers the permeate gas stream leaving one of the sets of collection ends and directs the gas to a permeate port.

The manifold is equipped with multiple outlets and extension pipes that connect to the collection ends, preferably reversibly, using connectors or couplings as mentioned above. The manifold is further connected to the appropriate permeate port in any convenient manner, such as by a flange or a screw thread, for example. Preferably the permeate port is equipped with a nozzle or flange facing inward, so that the connection of the manifold to the permeate port is also within the housing.

The piping and manifold form a permeate collection system that will be exposed to the pressure difference between the feed/residue gases and the permeate gas when the assembly is in use. The piping and manifold will often have to withstand a pressure difference of hundreds of psi and should be rated accordingly.

To facilitate connection of the permeate collection system to the ends of the permeate collection pipes and to the permeate port, the permeate outlet pipes or their extensions may be made from flexible piping.

This option for forming a permeate collection area is described further in co-owned and copending U.S. patent application Ser. No. 11/271,402, the relevant portions of which are incorporated herein by reference.

A second preferred way to form a permeate collection area is to divide the permeate collection area from the feed distribution area or from the residue collection area by means of an additional tube sheet that engages the tubes and the housing in gas-tight manner, such as by welding. If a tube sheet is used in this way, the tube sheet may be positioned at or near the tube end. In this case, the additional tube sheet provides additional support for the tubes, which may fit against or protrude through the tube sheet. The tube sheet may also be positioned beyond the ends of the tubes, so that only the ends of the permeate collection pipes reach or protrude through the tube sheet.

In either case, the tube sheet has openings or holes, aligned with the tubes, that are at least large enough for the permeate collection pipes, or extensions thereof, to protrude into the permeate collection area, and may optionally be large enough to accommodate the tubes themselves. If the openings in the tube sheet are as large as, or slightly larger than, the tubes, this enables the membrane elements to be inserted or removed from that end of the tube.

A gas-tight seal is provided between the tube sheet and the outer circumferential surface of the permeate pipes or extensions, to prevent gas flow from the residue or feed space to the permeate collection space via the annular gap around the pipe or pipe extension.

The seal may be permanent, if the vessel itself is permanently closed at that end, for example. More preferably, the seal is removable, and is made using a plate or flange attached to the permeate collection pipe extension and bolted or screwed against the tube sheet, using a gasket or O-ring to ensure a gas-tight seal. The tubes are spaced at least sufficiently far apart to accommodate the bolts or screws in the portions of the tube sheet between the tubes.

As another alternative, a bayonet-type seal, that is an elastomeric seal through which the permeate pipe or permeate pipe extension is pushed and that closes around the pipe in gas-tight fashion, can be used. In this case, it is not necessary that the head be removed when installing or removing membrane elements.

A preferred arrangement, if it is not required to remove the membrane elements from that end, is that the tube sheet contains openings just large enough that the permeate collection pipes, and their extensions and couplings, if any, can fit into or through the openings. This provides two advantages. First, the tube sheet is stronger mechanically, as more of its total area is solid. This is beneficial, as this tube sheet frequently has to withstand a pressure difference from the feed or residue side to the permeate side of several hundred psi. Secondly, the seal or end plate can be smaller in diameter, enabling the tubes to be packed closer together.

This option for forming a permeate collection area is described further in co-owned and copending U.S. patent application Ser. No. 11/050,995, the material portions of which are incorporated herein by reference.

Figure 2:
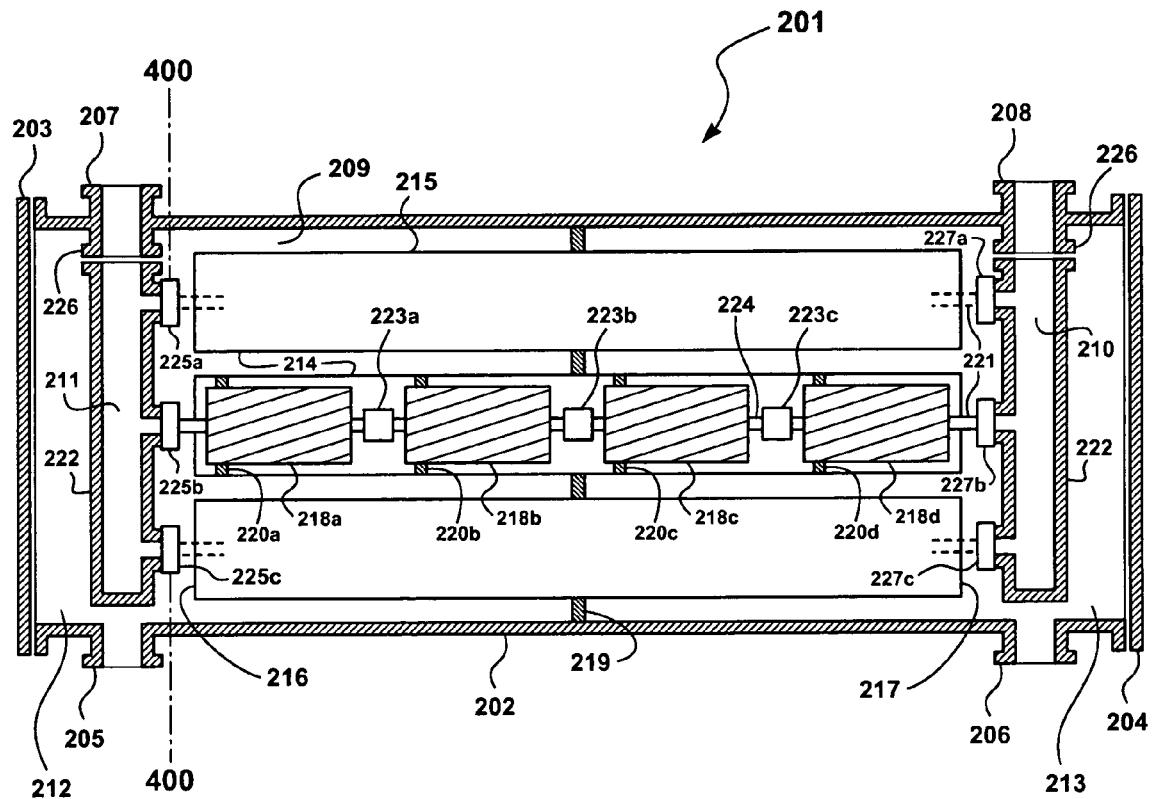
FIG. 2 is a schematic drawing showing a longitudinal section through an embodiment of the invention in which both permeate collection areas are formed by internal permeate manifolds.
Figure 3:
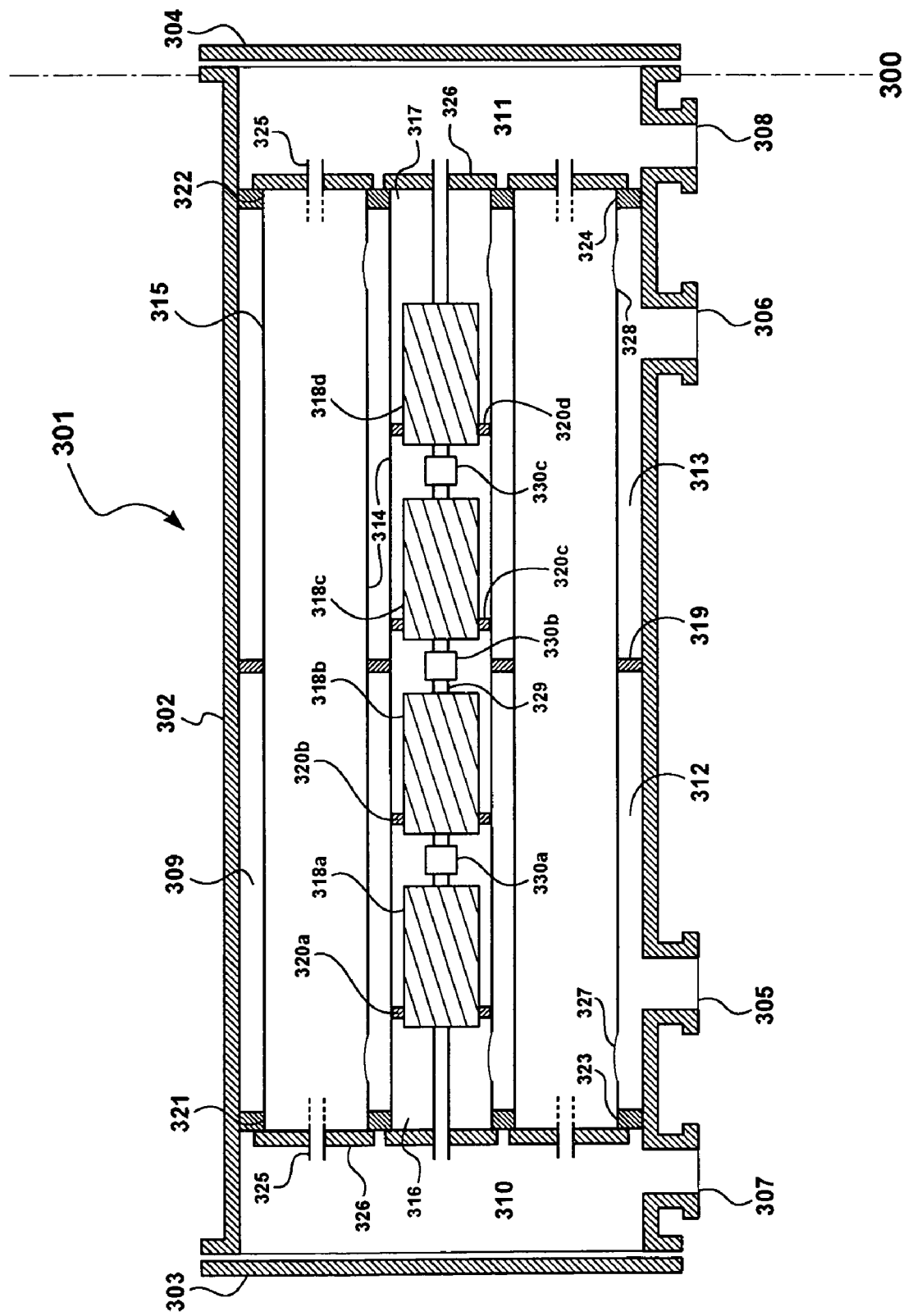
FIG. 3 is a schematic drawing showing a longitudinal section through an embodiment of the invention in which both permeate collection areas are formed by tube sheets.

The two preferred ways to form the permeate collection areas may be combined in one assembly, such that one permeate collection area is formed by a permeate manifold system and the other by the use of an additional tube sheet, as shown in FIG. 1. Alternatively, both collection areas may be formed by manifolds, one positioned toward one end of the housing and the other toward the other end, as shown in FIG. 2, or both collection areas may be formed by tube sheets, as shown in FIG. 3, so that one permeate collection area is separated from the feed distribution area by a tube sheet and the other is separated from the residue collection area by a tube sheet. In this case, three tube sheets are need to define the four areas.

A basic embodiment of the invention, including the principal elements or features of the assembly, is shown in FIG. 1, in the form of a simplified schematic drawing of a lengthwise central section of the assembly. Referring to this figure, the assembly comprises a housing generally indicated by numeral 101. The housing comprises a shell, 102 and removable heads, 103 and 104, and contains a plurality of tubes, 114, each with a first end, 116 and a second end, 117.

The vessel includes four ports, 105, 106, 107 and 108, in the outer wall, one port accessing each gas-tight area within the vessel. The ports enable gas to flow between environments outside the vessel, such as pipes, and the corresponding areas within the vessel.

The housing encloses an interior space, 109, which is divided by tube sheet, 119, to form a feed gas distribution area or space, 112, and a residue gas collection area or space, 113. The tube sheet typically take the form of a perforated plate, having a plurality of openings, 124, into which the tubes fit, so that end 116 is in the feed gas area and end 117 is in the residue gas area.

In FIG. 1, the tube sheet is shown as positioned toward one end of the housing. This position is representative, but not limiting. It will be clear from the drawing that the tube sheet could be positioned toward the other end of the housing, at or near the longitudinal center of the housing, or at any other position between the ends, so long as the tubes are supported and the feed gas distribution area and residue gas collection area are appropriately divided.

Each tube contains a series of membrane modules, indicated in a general manner by dashed box, 118. For clarity, the membrane module(s) are indicated on the figure only in the center tube. From the ends of the series of modules protrude permeate collection pipes, 121, having a first set of collection ends, 126, and a second set, 127.

The tubes have longitudinal walls, 115, in which are openings, 123, to allow gas to flow between the interior of the tubes and the residue collection area 113.

Three tubes are visible in the central longitudinal section, representing an assembly with 7 tubes in total, spaced as shown in axial view in the layout diagram of FIG. 5, discussed below.

The interior of the housing is further divided to form two permeate collection areas, 110 and 111. Area 110 is formed by second or permeate tube sheet, 120, which is perforated by openings, 125, again of about the same diameter as the tubes. This tube sheet is thicker than the feed-end tube sheet, 119, because it has to withstand a greater pressure difference.

Permeate collection pipes 121 project from tube ends 117 into the permeate gas collection area 110. End plates, 128, seal the ends of the tubes.

The second permeate collection area, 111, is formed by permeate manifold, 122, into which the permeate collection pipes are connected.

A representative and preferred embodiment of the invention is shown in longitudinal central section in FIG. 2. Referring to this figure, the assembly again includes a housing, generally indicated by numeral 201.

The housing has two removable heads, 203 and 204, and a cylindrical shell, 202, that together enclose interior region, 209. In the drawing, the heads are shown as flanged, and assumed to be connected to the shell by bolts (not shown), although any convenient means to connect the heads to the shell is intended to be within the scope of this embodiment.

A feed port, 205, and a permeate port, 207, are positioned near one head; a residue port, 206, and a second permeate port, 208, are positioned near the other. The permeate ports are adapted to provide internal flanges, 226.

The housing contains a plurality of tubes, 214, each having a longitudinal wall, 215, a feed end, 216, and a residue end, 217. Both ends are open.

Each tube contains four membrane elements, 218*a-d*, arranged in line along the tube. The membrane elements each have an individual permeate pipe, 224, protruding from both ends of the element, and the pipes are connected in line by connectors, 223*a-c*, to form a continuous permeate pipe that protrudes from the ends of the tubes at both ends. The modules are sealed against the tube walls by annular seals 220*a-d*.

For clarity, the membrane module(s) are only indicated on the drawing in the center tube. As with FIG. 1, three tubes only are shown in the central longitudinal section of FIG. 2, representing an assembly with 7 tubes in total, laid out as in FIG. 5.

A perforated tube sheet, 219, is welded or otherwise mounted in the housing. In FIG. 2, the tube sheet is positioned at about the longitudinal midpoint, to illustrate an optional positioning different from that of FIG. 1. In general, placing the tube sheet at one or the other end of the shell is preferred, as this simplifies fabrication.

The tube sheet divides feed gas distribution area, 212, from residue gas collection area, 213. The tube sheet supports the tubes in spaced-apart relationship with each other, with the tubes being positioned partly in the feed gas area and partly in the residue gas area, with the feed end protruding into the feed gas area and the residue end protruding into the residue gas area.

The tubes and tube sheets are sealed in gas tight relationship, by welding, glueing or by a gasket or sealing ring (not shown).

In this embodiment, both permeate collection areas, 210 and 211, take the form of manifolds, 222. The protruding ends (or extensions thereof), 221, of the permeate collection pipes are attached to the manifolds by connectors or fittings 225*a-c* at one set of pipe ends and by connectors or fittings 227*a-c* at the other set of ends. The manifolds are flanged so that they can be bolted to internal flanges 226.

Figure 4:
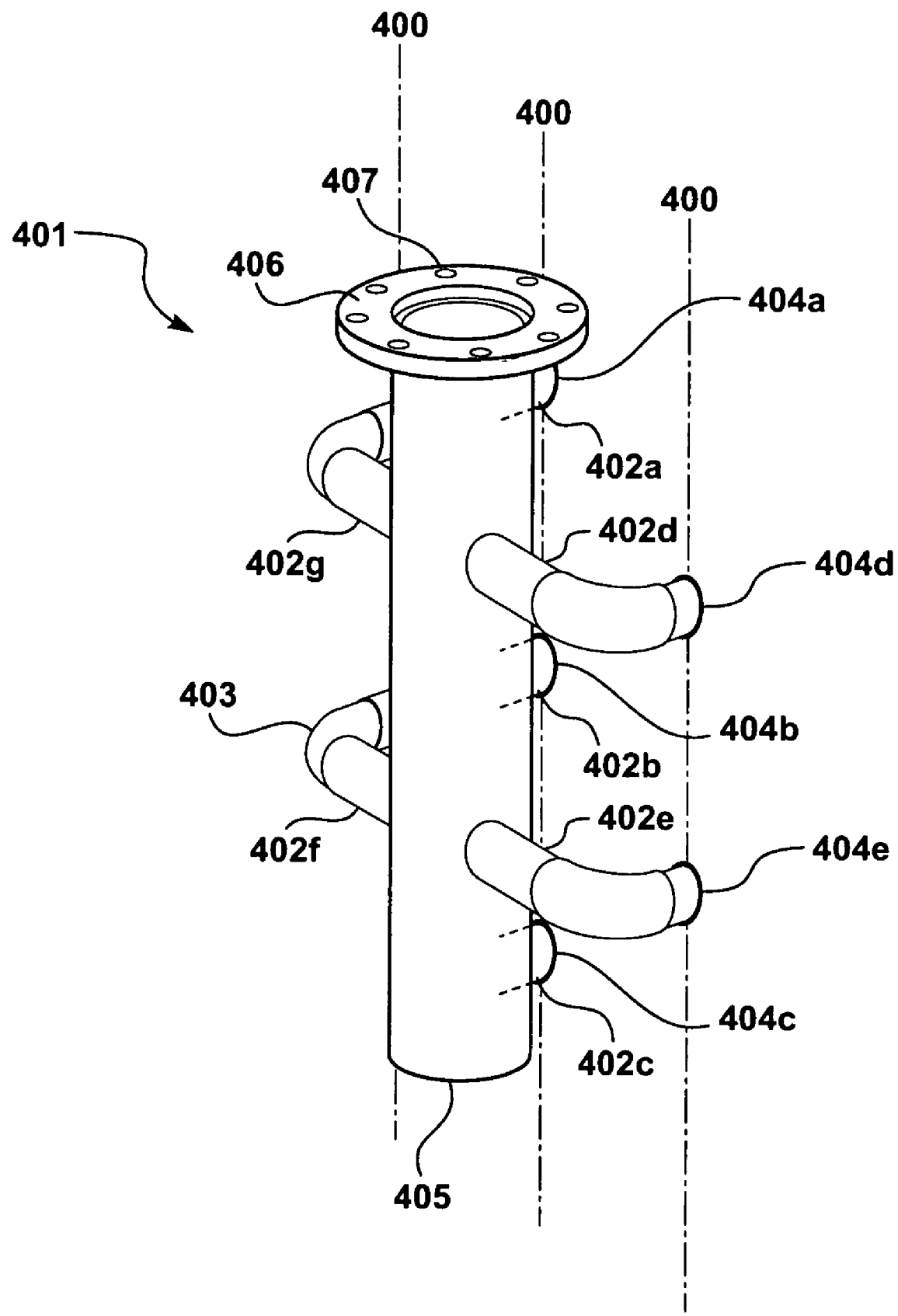
FIG. 4 is a schematic drawing of a preferred configuration for the permeate manifold system.

FIG. 4 shows in more detail a representative preferred option for configuring the manifolds and piping that make up the permeate collection system. Referring to this figure, the permeate collection system, generally indicated by numeral 401, has seven permeate outlet pipes, 402*a-g*, connected into permeate manifold, 405. Each pipe is equipped with a fitting or connector, 404*a-e* (ends of pipes 402*f* and 402*g* are not visible in the drawing), by which it can be connected to the protruding portions of the permeate collection pipes of FIG. 2 along the plane 400 identified in both figures.

For example, fitting 404*a* corresponds to or connects to fitting 225*a*, fitting 404*b* connects to or corresponds to fitting 225*b*, and fitting 404*c* connects to or corresponds to fitting 225*c*. Fittings 404*d-g* are for the permeate collection pipes associated with tubes 504*d-g*, the positions of which are not indicated on FIG. 2, but that can be seen in cross-section in FIG. 5, described in more detail below.

Outlet pipes 402*a-c* are straight and outlet pipes 402*d-g* are curved, so that the ends of these pipes are approximately in the plane 400. Pipes 402*d-g* may each be formed as a single curved length of piping, or may incorporate curved extension pieces, 403.

To facilitate connection of the permeate collection system to the ends of the permeate collection pipes and to the permeate port, the permeate outlet pipes or their extensions may be made from flexible piping. As one example, the straight portions of the pipe may be rigid, and extension pieces 403 may be flexible.

At the open end of manifold 405 is a flange, 406, with bolt holes, 407. This flange connects to interior flange 226 in FIG. 2.

An embodiment in which both permeate collection areas are formed by tube sheets is shown in FIG. 3. Referring to this figure, the assembly again includes a housing, generally indicated by numeral 301.

The housing has two removable heads, 303 and 304, and a cylindrical shell, 302, that together enclose interior region, 309. As with the embodiment of FIG. 2, the heads may be connected by any convenient means to the shell.

A feed port, 305, and a permeate port, 307, are positioned near one head; a residue port, 306, and a second permeate port, 308, are positioned near the other.

The housing contains a plurality of tubes, 314, each having a longitudinal wall, 315, and open ends, 316 and 317.

Each tube contains four membrane elements, 318*a-d*, arranged in line along the tube. The membrane elements each have an individual permeate pipe, 329, protruding from both ends of the element, and the pipes are connected in line by connectors, 330*a-c*, to form a continuous permeate pipe that protrudes from the ends of the tubes at both ends. The modules are sealed against the tube walls by annular seals 320*a-d*.

As in FIGS. 1 and 2, membrane modules are shown only in the center tube and three tubes are shown to represent an assembly with 7 tubes in total.

A perforated tube sheet, 319, divides the tube sheet divides feed gas distribution area, 312, from the residue gas collection area, 313 in gas-tight manner.

In this embodiment, both permeate collection areas, 310 and 311, are created by tube sheets. Area 310 is divided in gas-tight manner from feed gas distribution area 312 by tube sheet, 321, and area 311 is divided in gas-tight manner from residue gas collection area 313 by tube sheet, 322. Tube sheets 321 and 322 are thick enough to withstand the pressure differences expected between gases in the permeate areas and gases in the feed and residue areas. Tube sheets 321 and 322 are perforated by openings, 323 and 324, of about the same diameter as the tubes.

The protruding ends (or extensions thereof), 325, of the permeate collection pipes project beyond the open tube ends into the permeate collections spaces. Attached to the extensions or pipe ends are annular end-plates, 326, that make a gas-tight seal against the tube sheets. These plates may be welded in place, or may be removably attached, for example by screw threads, and sealed against the tube sheets using gaskets or O-rings.

Because the tube ends are sealed by the end-plates, gas cannot pass into or out of the ends except through the permeate extension pipes. To enable feed gas to reach the membrane modules, feed gas apertures, 327, are provided in the longitudinal tube walls. Likewise, to enable residue gas to reach the residue gas space, residue gas apertures, 328, are provided in the tube walls near the other end.

As discussed in detail in co-owned U.S. patent application Ser. No. 11/050,995, and mentioned above, a preferred arrangement, if it is not required to remove the membrane elements from that end, is that the tube sheet contains openings just large enough that the permeate collection pipes, their extensions and couplings can fit into or through the openings.

Figure 6:
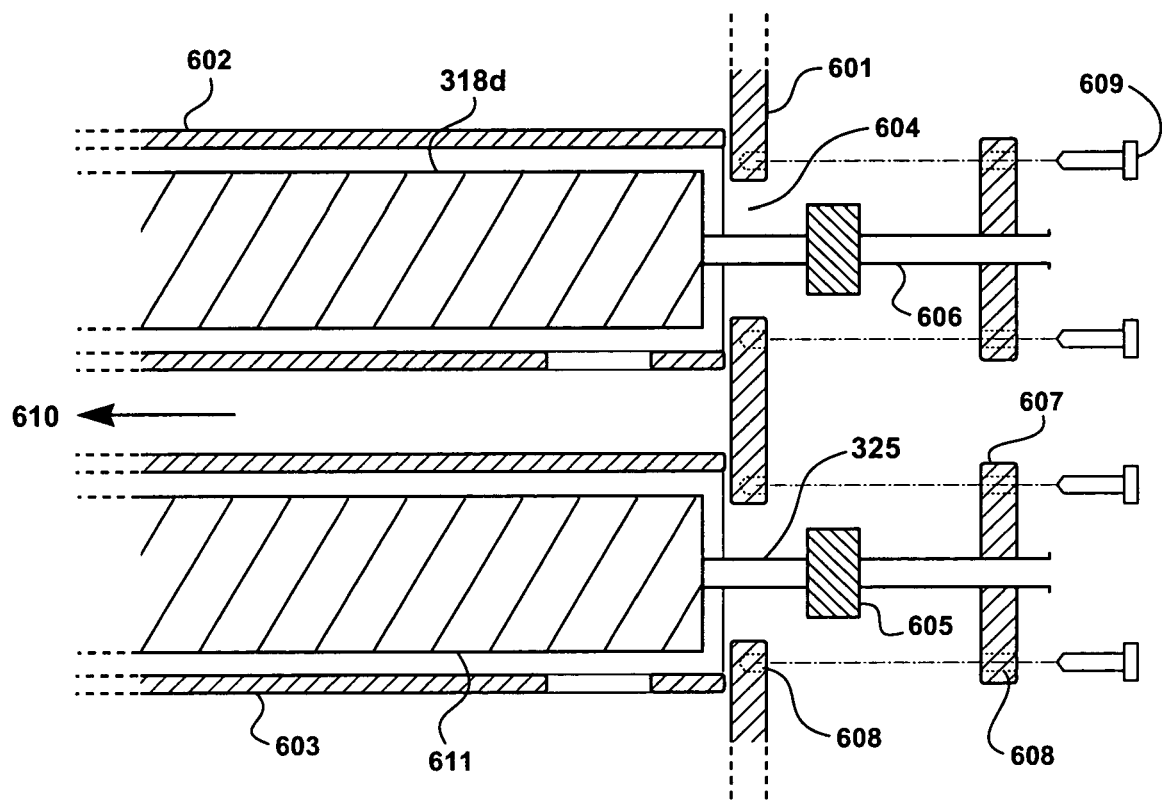
FIG. 6 is a schematic drawing showing an alternative configuration for the connection between the permeate collection area and the ends of the permeate collection tubes.

FIG. 6 shows the details of such an arrangement. The figure shows the ends of two adjacent tubes, 602 and 603, within the assembly. (These correspond to tubes 315 in FIG. 3, or 115 in FIG. 1.) Tube 602 corresponds with the center tube and the end of membrane element 318*d* is shown. Tube 603 is also assumed to contain four membrane elements, and the end of the last membrane element, 611, is shown.

Tube sheet, 601, corresponds to tube sheet 322 in FIG. 3, for example, except that the openings, 604, in the tube sheet are smaller than the tube diameters, being just large enough to enable connectors, 605, to slide through. The connectors couple the ends, 325, of the permeate collection pipes to extension pipes, 606.

Attached to the extension pipes are end plates, 607. As can be seen, the end plates are considerably smaller in diameter than the end plates 326 in FIG. 3, and have a diameter no larger than the diameters of the tubes. Tube sheet 601 and end plates 607 are equipped with bolt holes 608, through which they may be fastened together by bolts, 609. The bolt holes are positioned in the portion of the tube sheet that overlaps the ends of the tubes, not in the portion of the tube sheet between the tubes. O-rings or gaskets, not shown, may be used to make a gas-tight seal between the tube sheet and end plates.

To remove modules from a tube, 603 for example, the head is removed, end plate 607 is unbolted and pulled away from the tube sheet to the position shown in FIG. 6. This exposes coupling 605, which can be opened, so that extension pipe 606 can be separated from end 325 of the permeate pipe. The modules are removed by pulling out, in the direction of arrow, 610, from the other end. This requires the other ends of the tubes to be open the full width of the modules, and configured as shown in FIG. 3 or FIG. 2, for example.

Further details and options for this arrangement are described in co-owned and copending U.S. patent application Ser. No. 11/050,995, the material portions of which are incorporated herein by reference.

Figure 10:
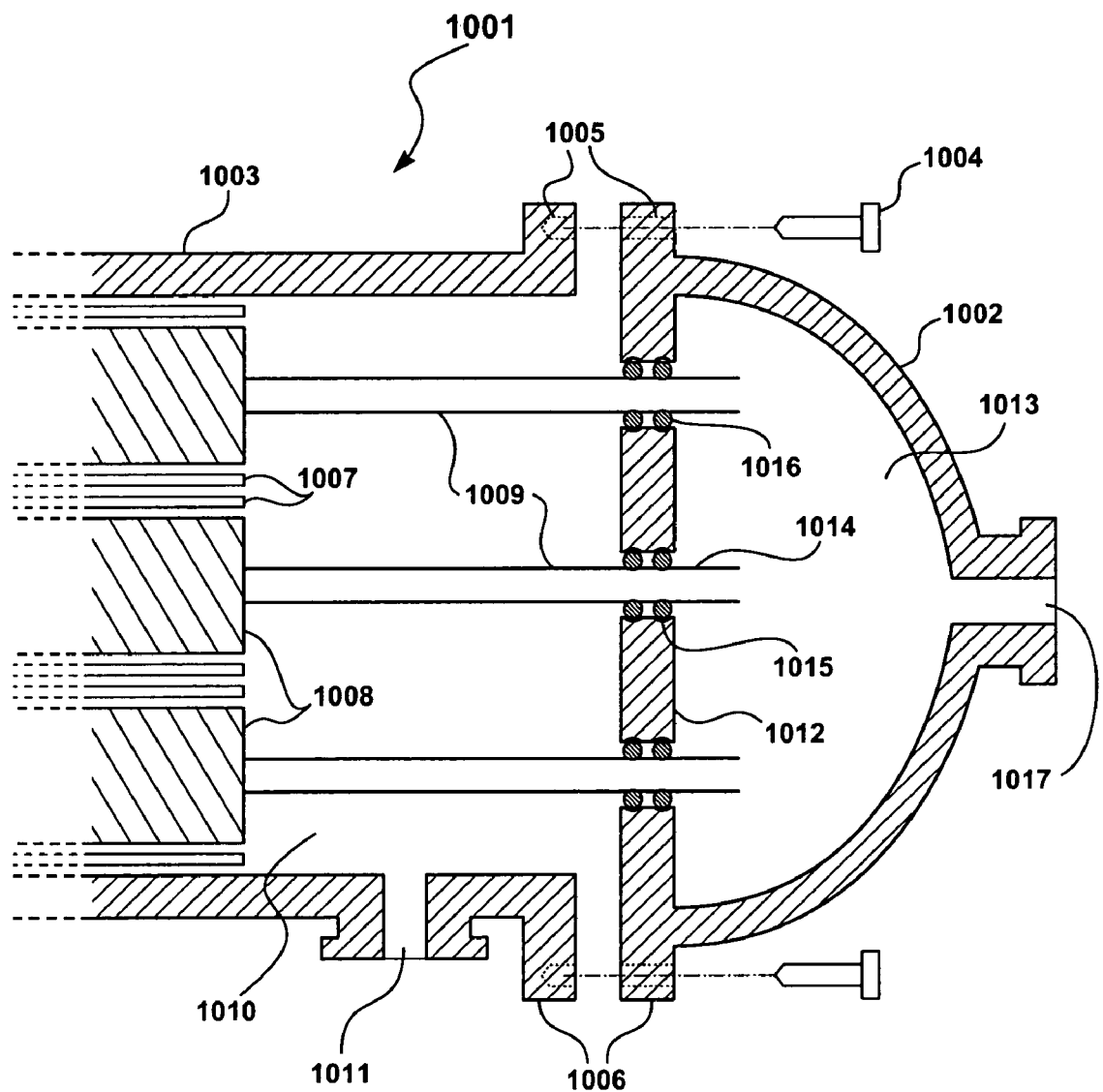
FIG. 10 is a schematic drawing showing an embodiment of the invention in which the tube sheet defining a permeate collection area is in the vessel head.

A different preferred arrangement for configuring the tube sheets and heads in an assembly such as that of FIG. 1 or FIG. 3 is shown in FIG. 10. In this case, the tube sheets that divide the permeate collection area from the feed gas distribution area or residue gas collection area are mounted in the housing not in the shell of the vessel, but in the head. This arrangement simplifies the engineering and manufacture of the assembly, because no component in the interior of the shell portion (except the membrane modules, which are manufactured separately) needs to be rated to withstand the feed-to-permeate or residue-to-permeate pressure difference.

Referring to FIG. 10, this shows one end of an assembly, 1001. Dished head, 1002, attaches removably to shell, 1003, by means of bolts, 1004, and bolt holes, 1005, in flanges, 1006. The figure shows the open ends of three tubes, 1007, and the ends of three membrane elements, 1008, within the tubes. The ends of permeate collection pipes, 1009, protrude some distance from the ends of the tubes, through residue collection space, 1010, from which gas may be withdrawn through residue port, 1011.

Tube sheet, 1012, forms part of head, 1002, and divides the residue collection area from permeate collection area, 1013, from which gas may be withdrawn through permeate port, 1017. The tube sheet is conveniently positioned as shown, in line with the flanges, in which case the flanges and tube sheet may optionally be formed by a single circular plate that is welded to the curved portion of the head.

Openings, 1014, in the tube sheet are smaller than the tube diameters, being just large enough to enable the permeate collection pipes to slide through. To mount the head onto the shell, the permeate pipes are pushed into the head through the openings, and engage the tube sheet in gas-tight manner by compressing one or more O-rings, 1016, seated in one or more grooves, 1015.

The use of this type of head design at one end of the assembly does not limit the configuration of the other end of the assembly, because the tube ends are open at this end. The other end of the assembly may be removable or fixed, and the configuration may take any convenient form, such as those shown in FIG. 1, 2, 3 or 6. A preferred option if both permeate collection spaces are defined by tube sheets, as in FIG. 3, is that the arrangement shown in FIG. 10 be repeated at the other end of the assembly. This provides good flexibility for installation at the user site, and facilitates easy replacement of modules.

FIGS. 1, 2, 3, 4, 6 and 10 show specific embodiments that demonstrate the best mode contemplated by the inventors of realizing their invention. It will be seen that a number of permutations and combinations of the arrangement of features is possible, and that a number of equivalent arrangements, especially for connecting elements, could readily be developed. These figures are intended to be representative, not limiting, of the invention.

Figure 5:
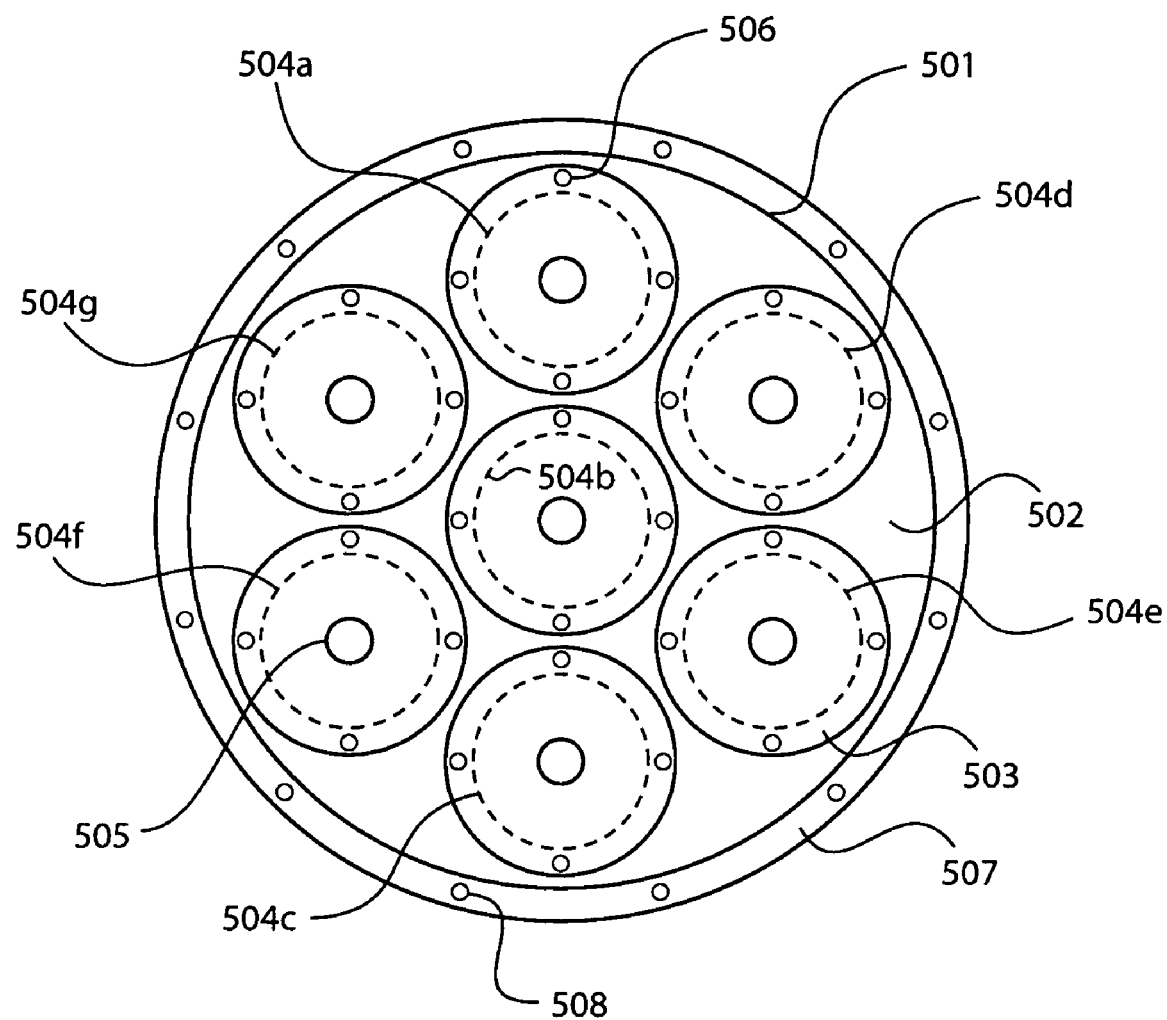
FIG. 5 is a schematic cross-section along plane 300 of the assembly shown in FIG. 3, looking into the housing with end 303 removed.

FIG. 5 shows a cross-sectional layout diagram of a preferred assembly containing seven tubes. The cross-section shows the relative placement of the tubes and the openings in the tube sheet, as would be viewed in FIG. 3 along line plane 300 looking towards the interior of the vessel with end 304 removed, or looking inside the shell from the right-hand end in FIG. 1.

FIG. 5 shows the end of shell wall, 501, including flange, 507, with bolt holes, 508, for attaching the head (not shown). Within the shell, the face of the tube sheet, 502, and seven end plates, 503, can be seen. These end plates cover seven openings in the tube sheet, that correspond in diameter to the ends of the tubes, indicated by dashed circles, 504*a-g*. The end plates are circular metal plates pierced by the permeate extension pipes, 505, and have diameters larger than the diameters of the tube openings that they cover. The plates have bolt holes, 506, positioned near their outer edges so as to overlap corresponding bolt holes in the tube sheet.

As will be apparent, from the above descriptions, FIG. 5 also identifies the placement of tubes in the embodiment of FIG. 2, except that no end plates are used for this embodiment.

Figure 7:
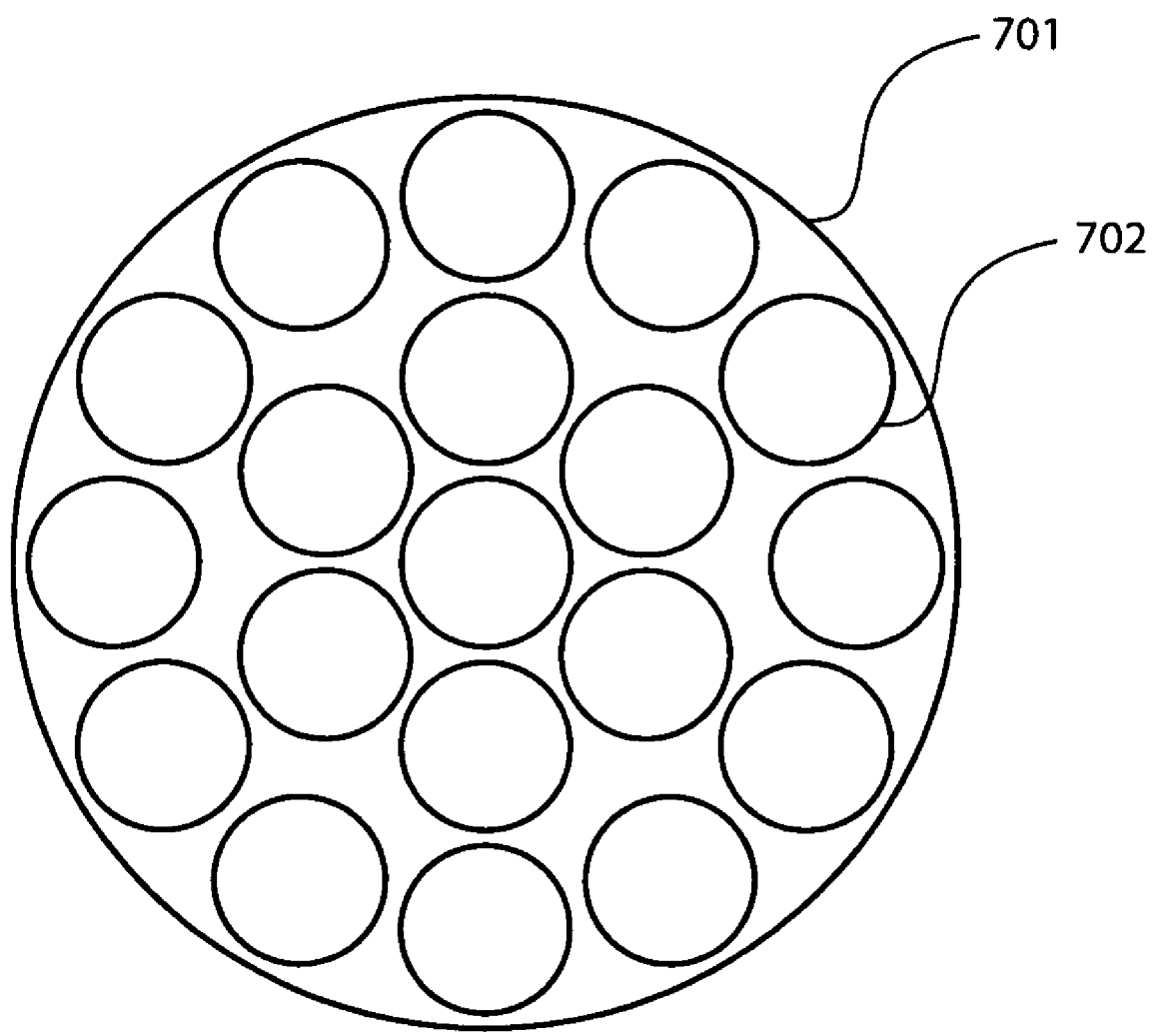
FIG. 7 is a schematic cross-sectional drawing showing placement of 19 tubes in the assembly.

FIG. 7 is a schematic cross-sectional drawing showing how the tubes could be arranged in a vessel, 701, having 19 tubes, 702.

It will be apparent those of skill in the art that the number of tubes in the housing is not limited to the 7 or 19 shown and described for representative purposes, and any number of tubes could be accommodated by simple and straightforward modification of the explicit teachings herein.

In another aspect, the invention is a gas separation process using the assembly in any of its embodiments. For example, referring again to FIG. 1, a feed gas mixture to be treated is introduced into port 105 and enters the feed gas distribution area 112. From here the gas passes into the tubes 115 and the membrane modules 118.

A driving force for transmembrane permeation is provided, usually by ensuring that there is a pressure difference between the feed and permeate sides of the membranes within the modules. This may involve compressing the feed gas, and/or drawing the permeate gas through a vacuum pump, for example, or any other method known in the art.

The feed gas mixture passes through the modules and is separated into two portions: a residue gas stream, that has not permeated the membranes, and a permeate gas stream, that has permeated the membranes. The residue gas stream passes from the tubes 115 through apertures 123 into the residue gas collection area 113 and is withdrawn through port 106. The permeate gas stream passes out of the ends of the permeate collection pipes into permeate collection areas 110 and 111, and exits the assembly through permeate ports 107 and 108.

An alternative process embodiment is to introduce the feed gas through port 106 and withdraw the residue gas through port 105. In this embodiment, the feed gas stream enters residue gas space 113 and flows from there into the tubes 115. The gas then enters the membrane modules at this end, flows along them and is withdrawn into feed gas space 112 and out through port 105. The permeate gas stream flows as before and is withdrawn through ports 107 and 108.

Similar gas flow schemes will be apparent to those of skill in the art for the embodiments shown in the other figures.

The processes as described above may be used to separate any gas or gases from any gas mixture. It is believed that the processes are particularly useful for natural gas treatment, such as to separate carbon dioxide, nitrogen or hydrocarbons from natural gas, for separation of hydrogen from hydrocarbons, or for various types of air separation.

The invention is now illustrated in further detail by specific examples. These examples are intended to further clarify the invention, and are not intended to limit the scope in any way.

EXAMPLES

Example 1

Comparison of Skid Size Requirements for Gas Separation System Using Conventional Pressure Tubes, Seven-Tube Vessels and 19-Tube Vessels An approximate comparison was made of the skid size that is needed to provide sufficient membrane capacity for a system constructed using prior art pressure tubes or the multi-tube pressure vessels of the invention.

Figure 8:
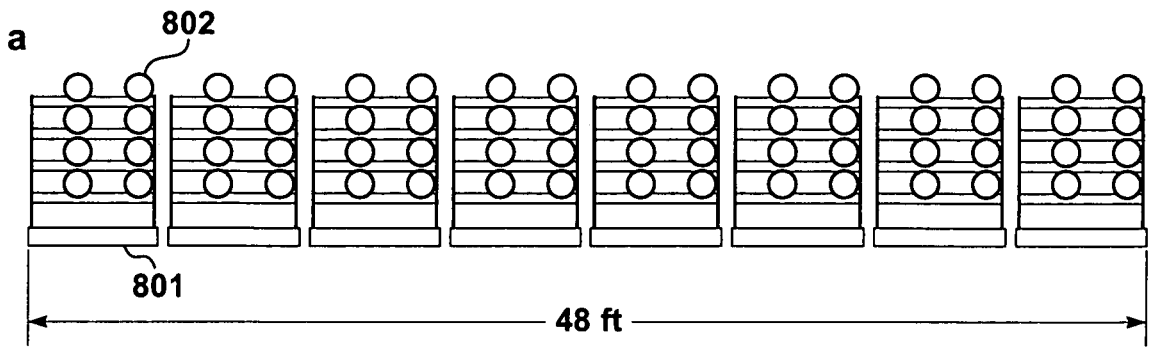
FIG. 8 is a diagram comparing the space requirements for three gas-separations assemblies.
Figure 8:
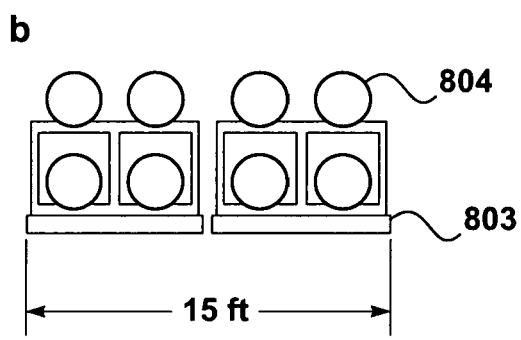
Figure 8:
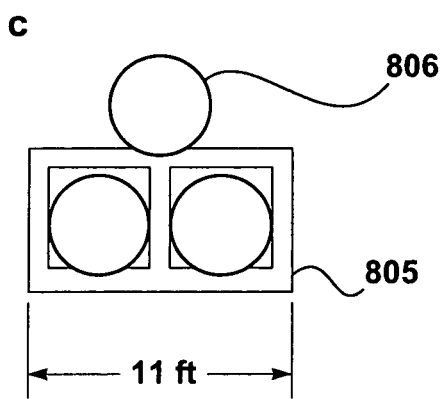

FIG. 8 illustrates the difference in footprint requirements for a gas-separation system using a conventional pressure vessel, a seven-tube vessel and a 19-tube vessel. The system was assumed to need about 4,500 to 5,000 m² of membrane area in the form of spiral-wound modules and to be operating at a feed pressure of about 500 psi. In each case, the membrane modules are arranged in an end-to-end series of 4 modules inside a tube, and the length of the skid is about 23 feet. The difference in size is evident in the different widths.

FIG. 8(a) shows a conventional configuration, not in accordance with the invention. The tube that contains the modules also serves as the pressure vessel so that each pressure vessel contains four modules. The system requires eight skids, 801, each holding eight pressure vessels, 802. The configuration as shown in FIG. 8(a) uses 256 modules and the total amount of membrane area is 5,120 m². Each skid is about six feet wide. The total area or footprint required per skid is 6×23 or about 140 ft². The total footprint required for 5,120 m² of membrane is thus 140×8 or 1,120 ft².

FIG. 8(b) shows a seven-tube pressure vessel skid configuration in accordance with the invention. The system requires two skids, 803, each holding four pressure vessels, 804. Each pressure vessel contains seven tubes. The configuration as shown in FIG. 8(b) uses 224 modules and the total amount of membrane area is 4,480 m². Each skid is 7.5 feet wide with a footprint of 7.5×23 or about 170 ft². The total footprint required for 4,480 m² of membrane is thus 170×2 or 340 ft². Compared with FIG. 8(a) above, the membrane system uses about one third the footprint required for the conventional system.

FIG. 8(c) shows a 19-tube pressure vessel skid configuration in accordance with the invention. The system requires one skid, 805, using 3 pressure vessels, 806. Each pressure vessel contains 19 tubes. The configuration as shown in FIG. 8(c) uses 228 modules and the total amount of membrane area for this configuration is 4,560 m². The skid is 11 feet wide with a footprint of 11×23 or about 250 ft². The total footprint required for 4,560 m² of membrane is thus 250 ft². Compared with FIG. 8(a) above, the membrane system uses under one quarter the footprint required for the conventional system.

As can be seen, multi-tube vessels substantially reduce the footprint size of the system. The weight is also reduced.

Example 2

Complexity Comparison of Conventional Pressure Tube, 7-Tube Vessel and 19-Tube Vessel Skid Configurations Table 1 compares some properties of standard skid configurations containing roughly comparable membrane area as illustrated in FIG. 8. Using the number of connection features (such as flanges) and tubes as one measure of complexity, it can be seen that seven- or 19-tube pressure vessels greatly decrease the complexity of the skid configuration.

TABLE 1

| Vessel Type | Number of skids | Vessels per skid | Total Vessels | Total footprint (ft²) | Total membrane area (m²) | Total Flanges |
|---|---|---|---|---|---|---|
| Conventional | 8 | 8 | 64 | 1,120 | 5,120 | 192 |
| 7-tube | 2 | 4 | 8 | 340 | 4,480 | 24 |
| 19-tube | 1 | 3 | 3 | 250 | 4,560 | 9 |

We claim:

1. A gas-separation assembly, comprising a housing including (i) first and second ends, (ii) a shell between the ends, and (iii) four ports in the housing through which gas may enter or leave the housing, the housing enclosing;
   (a) an interior region comprising four discrete, gas-tight areas, of which two areas are a first permeate collection area and a second permeate collection area, the third area is a feed gas distribution area and the fourth area is a residue gas collection area, each gas-tight area being provided with access to one port so that gas may enter or leave the gas-tight area through that port;
   (b) a plurality of tubes positioned in spaced-apart, parallel relationship, each tube having a longitudinal tube wall, a first tube end and a second tube end;
   (c) within the tubes, a multiplicity of gas separation membrane elements, each containing gas separation membranes, each gas separation membrane having a feed side and a permeate side;
   (d) for each tube, a permeate collection pipe adapted to capture a permeate gas from the gas separation membrane elements within that tube, each permeate collection pipe having a first collection end accessing the first permeate collection area and a second collection end accessing the second permeate collection area;
   (e) a tube sheet supporting the tubes and dividing the feed gas distribution area from the residue gas collection area.

2. The assembly of claim 1, wherein the first permeate collection area comprises a permeate manifold adapted to collect a permeate gas from the first collection ends and wherein one of the ports is a permeate port adapted to receive the permeate gas from the permeate manifold.

3. The assembly of claim 1, wherein the first permeate collection area comprises a first permeate manifold adapted to collect a first permeate gas from the first collection ends and wherein one of the ports is a first permeate port adapted to receive the first permeate gas from the first permeate manifold;

and further wherein the second permeate collection area comprises a second permeate manifold adapted to collect a second permeate gas from the second collection ends and wherein a second of the ports is a second permeate port adapted to receive the second permeate gas from the second permeate manifold.

4. The assembly of claim 1, further comprising a second tube sheet positioned in the interior region so that the first permeate collection area is created adjacent to one of the ends, and wherein the first collection ends protrude through the second tube sheet into the first permeate collection area.

5. The assembly of claim 1, further comprising second and third tube sheets positioned in the interior region so that the first permeate collection area is created adjacent to one of the ends by the second tube sheet, and the second permeate collection area is created adjacent to the other end by the third tube sheet, and wherein the first collection ends protrude through the second tube sheet into the first permeate collection area and the second collection ends protrude through the third tube sheet into the second permeate collection area.

6. The assembly of claim 1, wherein the first permeate collection area comprises a permeate manifold adapted to collect a permeate gas from the first collection ends and wherein one of the ports is a permeate port adapted to receive the permeate gas from the permeate manifold;

and further comprising a second tube sheet positioned in the interior region so that the second permeate collection area is created adjacent to one of the ends, and wherein the second collection ends protrude through the second tube sheet into the second permeate collection area.

7. The assembly of claim 1, wherein the longitudinal tube walls each have an aperture that enables gas to enter or leave the tubes.

8. The assembly of claim 1, wherein at least one end comprises a reversibly removable head.

9. The assembly of claim 1, wherein the gas separation membrane elements contain polymeric membranes.

10. The assembly of claim 1, wherein each gas separation membrane element has an individual permeate collection pipe and the individual permeate collection pipes are joined in series to form the permeate collection pipe.

11. The assembly of claim 1, wherein the plurality of tubes is 7 tubes.

12. The assembly of claim 1, wherein the plurality of tubes is 19 tubes.

13. The assembly of claim 1, wherein a multiplicity means between two and six.

14. The assembly of claim 1, wherein the gas separation membrane elements are spiral-wound modules.

15. The assembly of claim 4, wherein the first collection ends each have an external diameter and protrude through a plurality of openings in the second tube sheet, the openings having an opening diameter about the same as the external diameter.

16. The assembly of claim 1, wherein the first end comprises a dished removable head, and further comprising a second tube sheet that forms part of the head, such that the first permeate collection area is created within the head, the second tube sheet being perforated with openings large enough to allow the first collection ends to protrude through the second tube sheet into the first permeate collection area.

17. The assembly of claim 2, wherein the first collection ends are connected to the permeate manifold by flexible tubes.

18. The assembly of claim 1, wherein the permeate port has a flange protruding into the feed space to which the permeate manifold is connected.

19. The assembly of claim 1, wherein the housing is code-stamped for at least 500 psi and the tubes are not code-stamped.

20. The assembly of claim 1, wherein the housing is code-stamped for at least 1,000 psi and the tubes are not code-stamped.

21. A gas-separation process using the assembly of claim 1, and comprising:
 (a) introducing a feed gas stream into the feed gas distribution area and conducting the feed gas stream into the tubes and across the feed sides;
 (b) providing a driving force to induce gas permeation from the feed sides to the permeate sides;
 (c) withdrawing a permeate gas stream separately from each permeate collection area;
 (d) withdrawing a residue gas stream from the residue gas collection area.

22. The process of claim 21, wherein the feed gas mixture is natural gas.

* * * * *

UNITED STATES PATENT AND TRADEMARK OFFICE
CERTIFICATE OF CORRECTION

PATENT NO. : 7,758,670 B2  
APPLICATION NO. : 11/484547  
DATED : July 20, 2010  
INVENTOR(S) : Nicholas P. Wynn et al.

Page 1 of 1

It is certified that error appears in the above-identified patent and that said Letters Patent is hereby corrected as shown below:

In the Specification

Column 1, Line 5

Delete "DE-FG02-03ER83836" and substitute --DE-FG02-05ER84244--

Signed and Sealed this
Thirteenth Day of January, 2015

Michelle K. Lee
*Deputy Director of the United States Patent and Trademark Office*